United States Patent [19]

Ghougasian

[11] 4,030,825

[45] June 21, 1977

[54] VARIABLE SIZE AND ANGULARLY ADJUSTABLE PROJECTION DIAPHRAGM

[76] Inventor: John N. Ghougasian, 666 W. 188 St., New York, N.Y. 10040

[22] Filed: Dec. 29, 1975

[21] Appl. No.: 644,899

[52] U.S. Cl. .................................. 355/71; 96/45; 354/270

[51] Int. Cl.² ..................................... G03B 27/76

[58] Field of Search ............ 355/71; 96/45; 354/270

[56] References Cited

UNITED STATES PATENTS

| 3,177,763 | 4/1965 | Franqui | 355/71 X |
|---|---|---|---|
| 3,249,000 | 5/1966 | Pack | 355/71 X |
| 3,335,636 | 8/1967 | Atkinson | 355/71 X |
| 3,506,350 | 4/1970 | Denner | 355/71 X |
| 3,597,077 | 8/1971 | Dorn | 355/71 |
| 3,801,198 | 4/1974 | David | 355/71 X |

*Primary Examiner*—Richard A. Wintercorn
*Attorney, Agent, or Firm*—Clarence A. O'Brien; Harvey B. Jacobson

[57] ABSTRACT

A projection diaphragm assembly for achieving halftone negatives with conventional cameras capturing the range and contrast of reproduction materials to be copied, retarding the lighter gray from the white in black and white halftone negatives and separating the gray-white contrast relation for printing purposes is provided. The projection diaphragm is to be utilized in conjunction with a halftone screen of conventional form and may be utilized in front of the associated camera lens assembly or between the front and rear elements of the associated camera lens assembly. The diaphragm assembly includes a frame supported from the associated camera for angular displacement about the center axis of the camera lens assembly and a pair of aperture defining superposed plates are supported from the frame for simultaneous inverse rectilinear shifting diametrically of the associated camera lens axis. The plates are disposed normal to the associated lens axis and include variably registrable openings formed therethrough. When the openings are partially or fully registered with each other, they define an aperture centered on the center axis of the associated lens assembly and the cross-sectional shape of the aperture formed may be square, rectangular or generally elliptical, according to the cross-sectional shapes of the partially or fully registered plate openings defining the aperture. Of course, inasmuch as the frame supporting the plates is rotatable about the center axis of the associated lens assembly, a square or rectangular aperture may be rotated to define a diamond-shaped aperture and elliptical aperture may also be similarly rotated.

10 Claims, 11 Drawing Figures

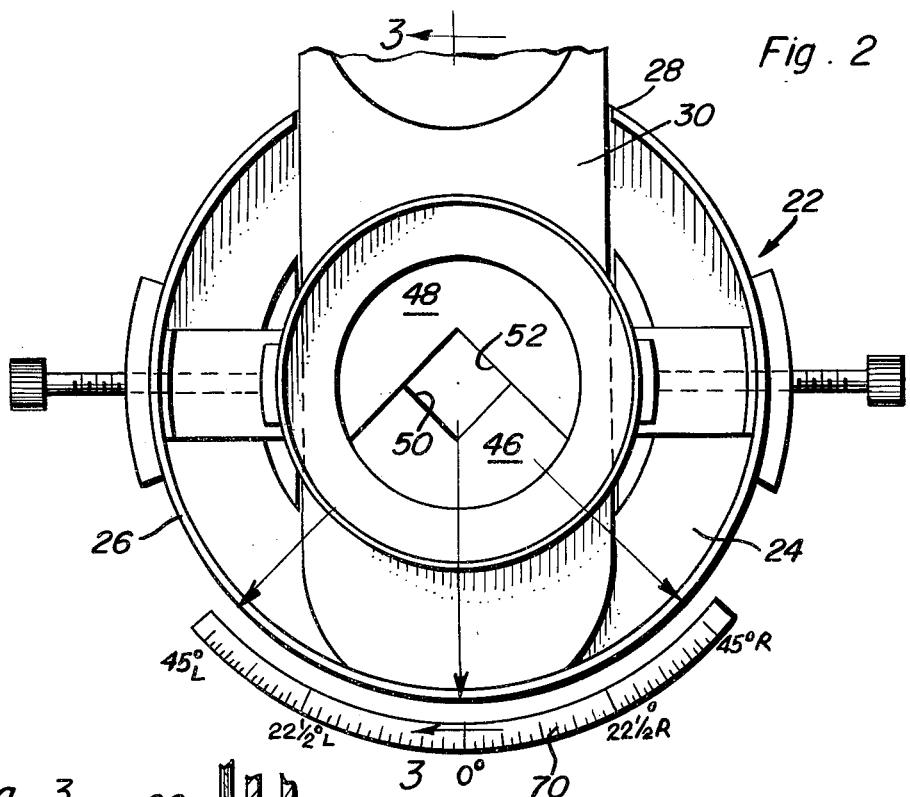
Fig. 2
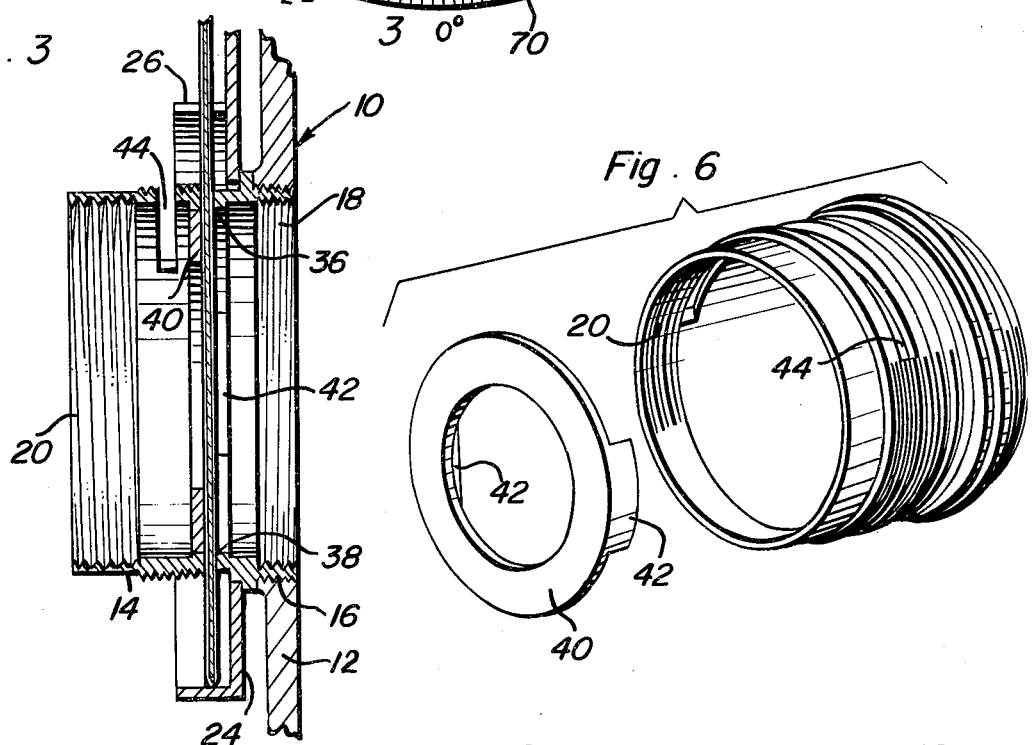
Fig. 3
Fig. 6
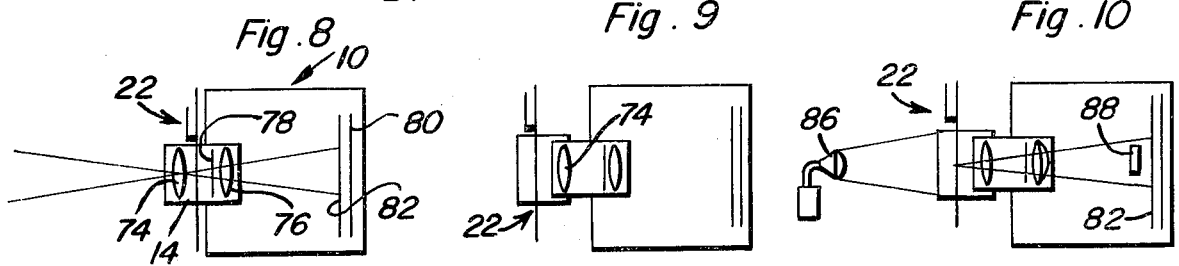
Fig. 8   Fig. 9   Fig. 10

VARIABLE SIZE AND ANGULARLY ADJUSTABLE PROJECTION DIAPHRAGM

BACKGROUND OF THE INVENTION

Heretofore various methods of halftone reproductions have been utilized and examples of various different structures designed for halftone reproduction are disclosed in U.S. Pat. Nos. 532,326, 1,247,682, 1,289,129, 1,732,051, 2,123,830, 2,489,840, 2,703,281, 2,920,547, and 3,040,644.

However, these various structures have been specifically designed to perform specific functions not including the capturing of the range and contrast of reproduction materials to be copied, retarding the lighter gray from the white in black and white halftone negatives and separating the gray-white contrast relation for printing purposes all in a single apparatus.

Some forms of previously known projection diaphragm structures have included means whereby the size of the aperture may be varied and also means for providing a plurality of apertures in predetermined pattern with the pattern of apertures rotatable about the center axis of the associated lens assembly. However, diaphragm structures for projection use constructed in a manner to provide both a variable size aperture of selected shape and the ability of the aperture formed to be angularly displaced about the center axis of the associated lens assembly and for the purpose of improving halftone reproduction and for color printing have not been heretofore provided.

BRIEF DESCRIPTION OF THE INVENTION

The projection diaphragm includes relatively adjustable superposed plates having selectively registrable openings formed therethrough and the plates are mounted from a support body or frame rotatable about the center axis of the associated lens assembly with the plates shiftable relative to the frame in a manner positioning the apertures defined by partially and fully registered plate openings to be centered relative to the lens axis. Further, the openings formed through the plates and the mounting of the plates for simultaneous inverse movement relative to the support frame enables the shape of the aperture defined to remain constant throughout adjustment of the plates to vary the size of the aperture.

The projecting diaphragm may be used in front of the associated lens assembly or between the front and rear elements of the associated lens assembly and the projection diaphragm may therefore be readily added to existing cameras or incorporated into the manufacture of new camera lens assemblies.

The main object of this invention is to provide an adjustable projection diaphragm for establishing a selectively variable size aperture and enabling an aperture of a particular predetermined shape to be angularly displaced about the center axis of the assoicated lens assembly.

Another object of this invention, in accordance with the immediately preceding object, is to provide a projection diaphragm including effective aperture size indicating means and also aperture angularly displacement indicating means.

Still another object of this invention is to provide a projection diaphragm assembly for use in conjunction with existing lens assemblies and constructed in a manner whereby the aperture defining plate assembly thereof may be readily replaced with an assembly designed to provide an aperture of a different shape.

A final object of this invention to be specifically enumerated herein is to provide an adjustable projection diaphragm in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an enlarged elevational view of the projection diaphragm illustrating its operative association with an angular displacement indicating scale to be provided on an associated camera;

FIG. 3 is a vertical sectional view taken substantially upon the plane indicated by the section line 3—3 of FIG. 2 and illustrating the manner in which the projection diaphragm mounted from a lens barrel to receive front and rear lens elements disposed to the front and rear, respectively, of the superposed plates of the diaphragm;

FIG. 6 is an exploded perspective view of the lens barrel illustrated in FIG. 3;

FIGS. 8 and 9 are schematic views illustrating the manner in which the projection diaphragm may be mounted between the front and rear lens elements of a camera and in front of the lens assembly, respectively;

FIG. 10 is a schematic view illustrating the manner in which the effective size of the aperture defined by a front mounted projection diaphragm may be determined by placing a light source in front of the projection diaphragm and obtaining a reading of the light incident upon the film plane of the camera by means of an internal light meter.

DETAILED DESCRIPTION OF THE INVENTION

Referring now more specifically to the drawings, the numeral 10 generally designates a camera including a front wall 12 having a lens barrel threadedly secured through an opening 16 formed in the front wall 12. The rear of the barrel 14 is internally threaded as at 18 to receive the rear element of a lens assembly and the front of the barrel 14 is internally threaded as at 20 to receive the front element of a lens assembly.

Figure 1:
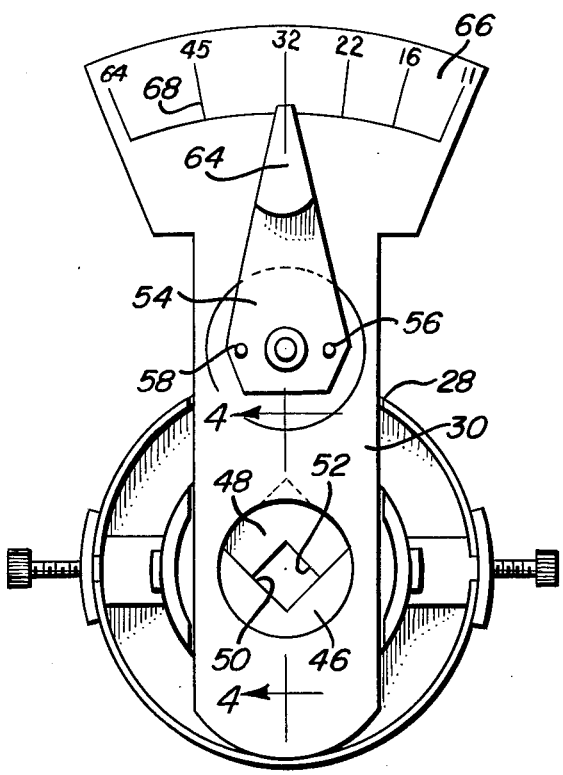
FIG. 1 is a front elevational view of a projection diaphragm constructed in accordance with the present invention and adapted to be utilized in conjunction with existing lens assemblies.
Figure 4:
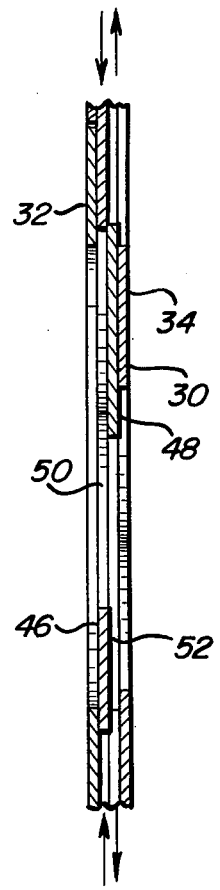
FIG. 4 is an enlarged fragmentary sectional view taken substantially upon the plane indicated by the section line 4—4 of FIG. 1.
Figure 5:
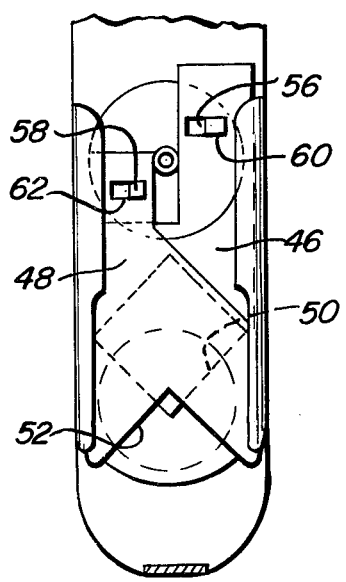
FIG. 5 is a fragmentary rear elevational view of the projection diaphragm.
Figure 7:
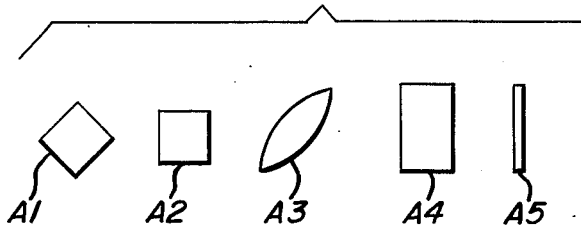
FIG. 7 is a schematic view illustrating the various shapes and sizes of apertures which may be defined by the projection diaphragm and also illustrating an angularly displaced diamond-shaped aperture defining position of a square aperture defining form of the invention.

The projection diaphragm is referred to in general by the reference numeral 22 and includes an annular mounting disc or frame 24 supported from the barrel 14 forward of the wall 12. The disc 24 includes a forwardly projecting peripheral wall 26 having a radial notch 28 formed therein and a flattened tubular mounting sleeve 30 including apertured front and rear walls 32 and 34 extends through the notch 28 and diametrically opposite slots 36 and 38 formed in the barrel 14. A ring 40 including diametrically opposite axial projections 42 is slipped within the barrel 14 with the projections 42 extending rearwardly and received on opposite sides of the narrow width edges of the mounting sleeve 30 and the upper portion of the barrel 14 is provided with the flash slit 44 immediately outward of the ring 40. A pair of superposed plates 46 and 48 disposed in surface to surface sliding contact with each other are slidingly disposed within the sleeve 30 for shifting longitudinally thereof. The plate 46 has a square opening 50 formed therein imtermediate its opposite ends and the plate 48 is a V-shaped opening 52 formed in its lower end. An upper portion of the front wall 32 of the sleeve 30 has a rotatable actuator 54 mounted thereon including pins 56 and 58 slidingly received through arcuate slots (not shown) formed in the front wall 32 and engaged in transverse openings 60 and 62 formed in the plates 46 and 48. Thus, oscillation of the actuator 54, including a pointer portion 64 registered with a sector plate portion 66 of the front wall 32 having indicia 68 thereon, will cause inverse rectilinear shifting of the plates 46 and 48 and variable registry of the openings 50 and 52. The center of the aperture defined by the registered portions of the openings 50 and 52 always remains registered with the center axis of the lens barrel 14 and the registry of the pointer 64 with the indicia 68 indicates the effective size of the aperture defined by the registered portions of the openings 50 and 52. With attention now invited to FIG. 7 of the drawings, and also to FIG. 5, it may be seen that the openings 50 and 52 define a diamond-shaped aperture and that the diamond-shaped aperture may be increased in size by upwardly shifting the plate 48 and downwardly shifting the plate 46 in response to clockwise angular displacement of the actuator 54 so as to define the large diamond-shaped aperture A1 of FIG. 7. In addition, by angularly displacing the lens barrel 14 relative to the front wall 12 the diamond-shaped aperture A1 may be transformed into a square aperture A2. Further, by varying the shapes of the openings 50 and 52 elliptical, rectangular and slit-shaped apertures A3, A4 and A5, respectively, may be defined. Of course, the apertures A3, A4 and A5 may also be angularly displaced upon rotation of the barrel 14 relative to the front wall 12, the front wall 12 having scale indicia 70 thereon to indicate right- or left-hand angular displacement of the lens barrel 14 from a position with the openings 50 and 52 defining the diamond-shaped aperture A1.

With attention now invited more specifically to FIG. 8 of the drawings, it may be seen that the projection diaphragm 22 is supported from the lens barrel 14 intermediate the front and rear lens elements 74 and 76 of the camera 10. Of course, the lens assembly comprising the barrel 14 and the elements 74 and 76 may also include the usual diaphragm 78, which usual diaphragm is retained in its full open position when utilizing the diaphragm 22. Further, film 80 to be exposed is positioned at the film plane of the camera 10 and the halftone plate 82 to be used in halftone work is placed immediately in front of the film plane 80.

On the other hand, it may be seen from FIG. 9 of the drawings that the projection diaphragm 22 may be positioned forward of the front lens elements 74 and from FIG. 10 it may be seen that a suitable light source 86 may be placed in front of the projection diaphragm 22 with a light meter 88 disposed immediately forward of the halftone plate 82 in order that the effective opening of the aperture defined by the projection diaphragm 22 may be determined by the light meter.

If it is desired, the opening 52 may be closed and provided with 45 degree angulated cross-wave hairing and the aperture 50 may be provided with 135 degree cross-wave hairing. Such cross-wave hairing will produce a diffused image for "bumping" white when direct screening may be used to produce a diffused image for making a pre-mask negative used in conjuction with making continuous tone separation negatives in black and white or for color work where contrast ranges are suppressed or enlarged.

By varying the size of the aperture defined by the openings 50 and 52 and by variably rotating the projection diaphragm, variable heretofore not possible are realized. The utilization of square- and diamond-shaped apertures in conjunction with the halftone screen 82 reduces "flare" caused by round apertures. Also, control of the separation and contrast range of the reproduction material to be copied is provided and the range and contrast of the copy material to be reproduced may be captured. Thereafter, the proper amount of development to compress or extend the range, as desired, may be achieved.

Figure 11:
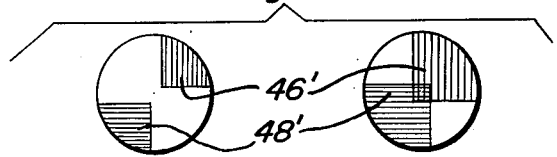
FIG. 11 is a schematic view illustrating various additional shapes and sizes of apertures which may be defined by the projection diaphragm.

With attention invited to FIG. 11 it may be seen that the superposed plates 46 and 48 may include right angle corner portions 46' and 48' shiftable relative to each other between spaced apart positions defining an hour glass shaped aperture and overlapped positions defining a pair of spaced generally triangular apertures.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a camera including a forward lens assembly, means defining a film plane spaced rearward of said lens assembly and a halftone screen disposed immediately forward of said film plane, a projection diaphragm assembly including a support frame supported from said camera along the axis of said lens assembly for angular displacement about said axis, said diaphragm assembly including a pair of superposed plates disposed substantially normal to said axis and supported from said frame for inverse rectilinear oscillation along parallell paths extending generally diametrically of said axis, said plates having variably registrable openings formed therethrough of similar shapes and positioned relative to said axis whereby the aperture of said diaphragm assembly defined by registered portions of said openings is centered relative to said axis and the cross sectional shape of said aperture remains substantially constant throughout changes in the effective size of the aperture effected by inverse shifting of said plates relative to said frame.

2. The combination of claim 1 wherein said aperture is substantially square shaped.

3. The combination of claim 1 wherein said aperture is substantially rectangular shaped.

4. The combination of claim 1 wherein said aperture is substantially navicular shaped.

5. The combination of claim 1 including indicator means indicating predetermined rotated positions of said frame about said axis.

6. The combination of claim 1 including indicator means indicating predetermined inversely shifted positions of said plates relative to said frame.

7. The combination of claim 1 wherein said lens assembly is disposed forward of said diaphragm assembly.

8. The combination of claim 1 wherein said lens assembly is disposed intermediate front and rear lens elements of said lens assembly.

9. The combination of claim 1 wherein said aperture is substantially hour glass shaped.

10. The combination of claim 1 wherein said aperture is defined by a pair of spaced generally triangular aperture portions.

* * * * *